United States Patent [19] [11] Patent Number: 6,094,347
Bhatia [45] Date of Patent: Jul. 25, 2000

[54] AIRFLOW HEAT EXCHANGER FOR A PORTABLE ELECTRONIC DEVICE AND PORT REPLICATOR, DOCKING STATION, OR MINI-DOCKING STATION

[75] Inventor: Rakesh Bhatia, San Jose, Calif.

[73] Assignee: Intel Corporation, Santa Clara, Calif.

[21] Appl. No.: 09/226,966

[22] Filed: Jan. 8, 1999

[51] Int. Cl.[7] .................................................. H05K 7/20
[52] U.S. Cl. .......................... 361/695; 361/687; 361/694; 361/696; 361/700; 361/703; 165/104.33; 174/15.2; 395/281; 395/283
[58] Field of Search .......................... 361/687, 704–712, 361/725, 686, 694–697, 700, 703, 692, 693; 165/58, 185, 104.33, 86, 104.32, 104.34; 174/15.1, 52.4, 15.2, 252; 395/281, 283, 750.08, 750.01, 700, 750.06

[56] References Cited

U.S. PATENT DOCUMENTS

| | | | |
|---|---|---|---|
| 4,449,576 | 5/1984 | Baum et al. | 165/104 |
| 5,121,291 | 6/1992 | Cope et al. | 361/384 |
| 5,159,972 | 11/1992 | Gunnerson et al. | 165/32 |
| 5,195,576 | 3/1993 | Hatada | 165/80.3 |
| 5,198,889 | 3/1993 | Hisano et al. | 257/678 |
| 5,255,109 | 10/1993 | Klein | 359/43 |
| 5,313,362 | 5/1994 | Hatada et al. | 361/709 |
| 5,361,188 | 11/1994 | Kondou et al. | 361/695 |
| 5,402,312 | 3/1995 | Kinjo et al. | 361/695 |
| 5,409,055 | 4/1995 | Tanaka et al. | 165/104 |
| 5,414,591 | 5/1995 | Kimura et al. | 361/695 |
| 5,424,913 | 6/1995 | Swindler | 361/687 |
| 5,427,502 | 6/1995 | Hudson | 415/211.1 |
| 5,430,609 | 7/1995 | Kikinis | 361/687 |
| 5,441,576 | 8/1995 | Bierschenk et al. | 136/203 |
| 5,458,189 | 10/1995 | Larson et al. | 165/104.33 |
| 5,475,563 | 12/1995 | Donahoe et al. | 361/695 |
| 5,513,070 | 4/1996 | Xie et al. | 361/700 |
| 5,522,712 | 6/1996 | Winn | 417/436 |
| 5,550,710 | 8/1996 | Rahamim et al. | 361/687 |
| 5,559,673 | 9/1996 | Gagnon et al. | 361/695 |
| 5,559,675 | 9/1996 | Hsieh et al. | 361/707 |
| 5,583,316 | 12/1996 | Kitahara et al. | 174/16.3 |
| 5,588,483 | 12/1996 | Ishida | 165/86 |
| 5,598,320 | 1/1997 | Toedtman et al. | 361/687 |
| 5,621,613 | 4/1997 | Hayley et al. | 361/687 |
| 5,646,822 | 7/1997 | Bhatia et al. | 361/687 |
| 5,646,824 | 7/1997 | Ohashi et al. | 361/699 |
| 5,664,118 | 9/1997 | Nashigaki et al. | 395/283 |
| 5,694,292 | 12/1997 | Paulsel et al. | 361/686 |
| 5,694,294 | 12/1997 | Ohashi et al. | 361/687 |
| 5,704,212 | 1/1998 | Erler et al. | 62/3.2 |
| 5,768,101 | 12/1996 | Cheng | 361/687 |
| 5,831,823 | 11/1998 | Hoedl | 361/695 |
| 5,884,049 | 3/1999 | Atkinson | 395/281 |
| 5,959,836 | 9/1999 | Bhatia | 361/687 |

FOREIGN PATENT DOCUMENTS 0702287   2/1996   European Pat. Off. ......... G06F 1/20

*Primary Examiner*—Leo Picard
*Assistant Examiner*—Michael Datskovsky
*Attorney, Agent, or Firm*—Jeffrey S. Draeger

[57] ABSTRACT

An airflow heat exchange apparatus. One embodiment includes a housing configured to removably mate with an electronic device. The housing has a vent on a substantially horizontal surface and a fan positioned to increase airflow through the electronic device when the electronic device is mated with the housing. An electronic connector is positioned to be electronically coupled to signal lines from the electronic device when the electronic device and housing are mated.

17 Claims, 6 Drawing Sheets

AIRFLOW HEAT EXCHANGER FOR A PORTABLE ELECTRONIC DEVICE AND PORT REPLICATOR, DOCKING STATION, OR MINI-DOCKING STATION

BACKGROUND

1. Field of the Invention

The present disclosure pertains to the field of heat removal from electronic components. More particularly, this disclosure relates to heat removal from an electronic device such as a portable computer which mates with another device such as a port replicator.

2. Description of Related Art

Faster and more powerful computer components allow the design and construction of higher performance portable computing devices such as laptop or notebook computers. Unfortunately, the use of such faster and more powerful computer components often results in increased heat generation by such computing devices. Thus, improved heat dissipation technology is often needed to maintain operating temperatures of portable computing devices within the same range as their predecessors or some other acceptable range.

Maintaining operating temperatures of computer system components below certain levels is important to ensure performance, reliability, and safety. Most integrated circuits have specified maximum operating temperatures, above which the manufacturer does not recommend operation. Additionally, most integrated circuits have timing specifications that specify a window of time in which input signals need to be received for proper functioning as well as a window of time in which output signals are generated under normal operating conditions. Transistors, the building blocks of integrated circuits, tend to slow down as operating temperature increases. Thus, a computer system that operates its integrated circuits close to or beyond recommended timing specifications may fail as temperature increases.

Additionally, integrated circuits may be physically damaged if temperatures elevate beyond those recommended. Such physical damage obviously can impact system reliability. Finally, the computer system casing should be kept at a temperature which is safe for human contact. This may necessitate spreading of heat throughout a computer system base or efficiently expelling heat to avoid hot spots near certain components such as a processor.

Typically, heat sinks, fans, and heat pipes are employed to dissipate heat from integrated circuits and other electronic components. Increases in heat generation are often accommodated by simply increasing the quantity or size of these heat dissipation elements. The relatively small size of a portable computing device, however, complicates heat dissipation by limiting airflow, crowding heat generating components, and reducing the space available for heat dissipation devices.

A docking station is one well known computing device that mates with a portable computing device to allow the portable computing device access to various resources available to the docking station. Many portable devices such as personal digital assistants and/or organizers and communication devices may utilize such a docking station arrangement. Many portable computers (i.e., laptops or notebook computers) can also operate in a docking station arrangement.

Additionally, "port replicators" (also known as "mini-docking stations") are popular accessories for portable computing devices. Port replicators generally provide a housing that mates with the portable electronic device. The housing typically includes a physical mating to mate with the chassis of the portable electronic device as well as an electronic connector for connecting to signal lines from the portable electronic device. The port replicator provides ports which may be connected to additional peripherals such as a serial device, a parallel device, a monitor, a keyboard, a game pad or joystick, a universal serial bus device, or a mouse. Additionally, the port replicator may include a power supply for the portable computing device. Collectively, docking stations, mini-docking stations, port replicators, and like devices are referred to herein as "docking devices."

Mating a portable computing device with a port replicator often provides a low cost mechanism to expand the usefulness of the portable computing device. Such port replicators typically include a horizontal or substantially horizontal surface that extends beneath the portable electronic device when the two are mated. Current port replicators, however, may not provide any additional cooling capacity for electronic devices which are mated thereto.

Although prior art systems have injected airflow into non-portable computer system components (see, e.g., U.S. Pat. No. 5,559,673), the prior art does not provide an apparatus that adequately enhances airflow to a removably mated electronic device from beneath. Thus, prior art arrangements may fail to take advantage of a horizontal surface that could be used for cooling purposes and is available with a variety of docking devices.

SUMMARY

An airflow heat exchange apparatus is disclosed. One embodiment includes a housing configured to removably mate with an electronic device. The housing has a vent on a substantially horizontal surface and a fan positioned to increase airflow through the electronic device when the electronic device is mated with the housing. An electronic connector is positioned to be electronically coupled to signal lines from the electronic device when the electronic device and housing are mated.

BRIEF DESCRIPTION OF THE FIGURES

The present invention is illustrated by way of example and not limitation in the figures of the accompanying drawings.

DETAILED DESCRIPTION

The following description provides an airflow heat exchanger for a portable electronic device and port replicator, docking station, or mini-docking station. In the following description, numerous specific details such as vent and fan placement and specific electronic device and component types are set forth in order to provide a more thorough understanding of the present invention. It will be appreciated, however, by one skilled in the art that the invention may be practiced without such specific details.

Some embodiments of an airflow heat exchanger disclosed advantageously provide improved cooling of electronic devices having horizontal surfaces adjacent to surfaces of the docking devices at which the electronic devices may be docked. Various arrangements of vents, heat sinks, heat transfer elements, air ducts, and fans may be utilized. By providing additional cooling capacity when electronic devices are docked, some disclosed embodiments may extend component life and/or allow components to be operated in a higher power mode (e.g., faster) when docked.

Figure 1:
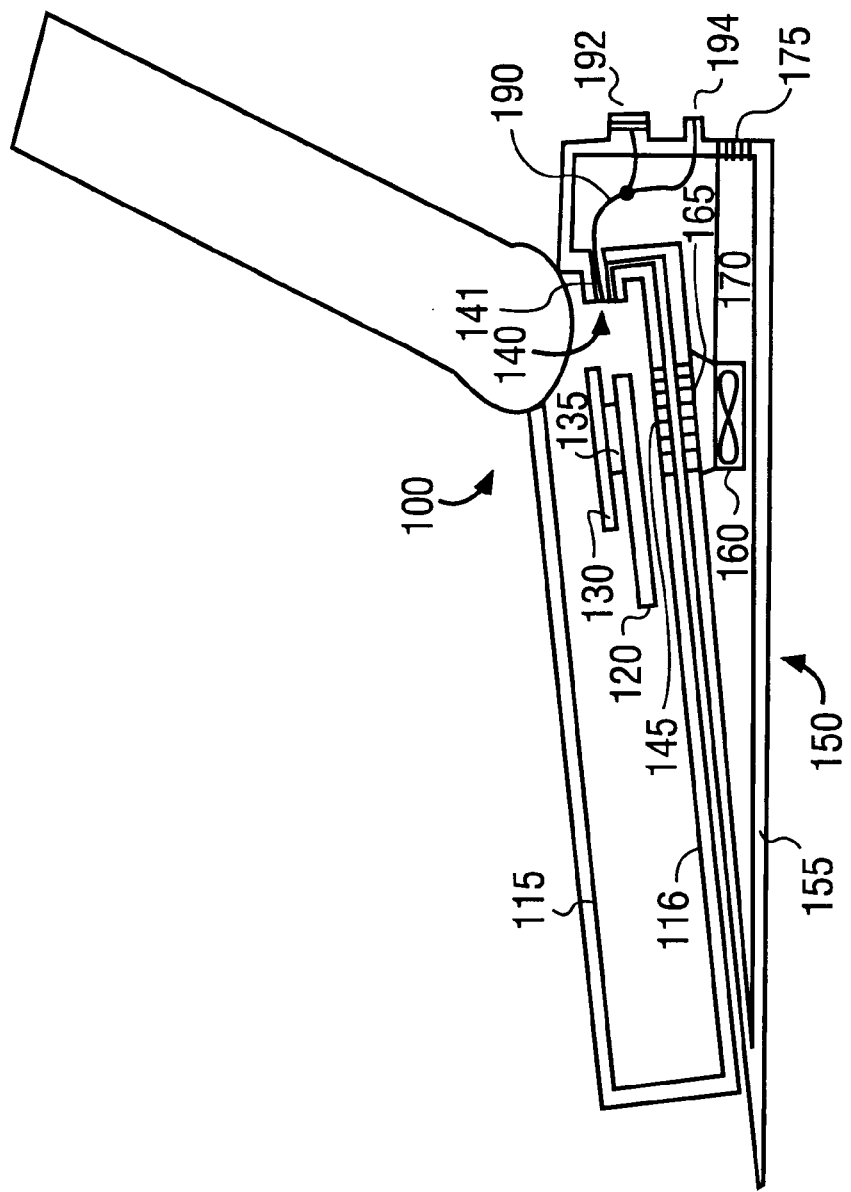
FIG. 1 illustrates a cross sectional view of one embodiment of an airflow heat exchanger for an electronic device and docking device utilizing a horizontal fan arrangement.

FIG. 1 illustrates one embodiment of a mated electronic device and docking device utilizing an airflow heat exchanger. In this embodiment, the electronic device is a portable computing device 100 and the docking device is a port replicator 150. The airflow heat exchange mechanism in the port replicator 150 includes a fan 160 that increases airflow through the bottom of the portable computing device 100, thereby cooling components, regions, power supplies, or any portion of the portable computing device 100. Moreover, electronic devices other than portable computing devices may utilize such a cooling technique when a dock arrangement with a substantially horizontal mating surface is used.

The position of a portion of the port replicator 150 beneath the portable computing device 100 allows cooling through the typically inaccessible bottom surface of the portable computing device 100. Thus, the fan 160 in the port replicator 150 provides a new airflow up through (perpendicular to) the bottom surface of the portable computing device 100. With increased airflow through the bottom surface of the portable computing device 100, the components, vents, and housing may create an enhanced airflow region in the portable computing device 100.

The port replicator 150 has a housing 155 shaped to accommodate the portable computing device 100 when the two are mated. An electronic connector 141 protrudes from a rear portion of the port replicator 150 and is positioned to achieve an electrical connection with a connector 140 of the portable computing device 100. A number of signal lines 190 pass through the connectors 140 and 141, and one or more may be connected to electrical connectors 192 and 194 on the port replicator 150. Thus, one or more signal lines from the portable computing device 100 are coupled to the connectors 192 and 194, which are typically used to connect to peripheral devices, a keyboard, a monitor, or other devices.

The components of the airflow exchanger in the embodiment of port replicator 150 illustrated in FIG. 1 include several ducts, vents, and a fan. One duct may extend upward from the fan 160 to a vent 165. In this embodiment, the fan is mounted in a horizontal position to preserve the slim profile of the port replicator 150. The fan 160 may either draw air downward through the vent 165, thereby sucking air through the portable computing device 100, or may blow air up through the vent 165, thereby forcing air in and through the portable computing device 100.

A duct 170 extends sideways from the fan 160 to a vent 175 at the rear of the port replicator 150. The fan 160 may be designed to force air vertically, in which case a space is typically left beneath the fan 160 to channel air sideways to the duct 170 and the vent 175. Alternatively, the fan 160 may be designed to expel or intake air in a direction perpendicular to the axis of rotation of the fan (i.e., directly from the duct 170), and therefore the fan 160 may be mounted on the bottom surface of the port replicator 150.

In the illustrated embodiment, the portable computing device 100 is a laptop or notebook computer. The portable computing device 100 may include an input device (e.g., a keyboard) on a top surface thereof. The portable computing device 100 is typically relatively short in height compared to its width and length, which may be larger to accommodate the input device or a display. A vent 145 is formed in a bottom surface 116 of the housing 115 and is positioned to align with the vent 165 when the computing device 100 is docked. When docked, air is either blown in to or drawn out of the vent 145 and airflow is increased over a circuit board 120, an electronic component 135, and a heat sink 130. In one embodiment, the electronic component 135 is a microprocessor for the portable computer. Due to the increased cooling provided when the computer is docked, the microprocessor may be operated in a higher power mode when docked at a port replicator utilizing an airflow heat exchanger.

Figure 2:
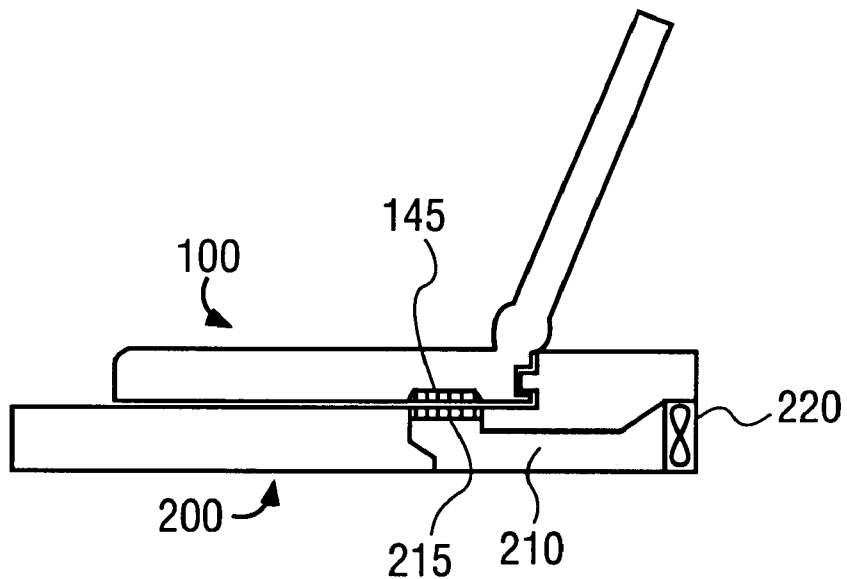
FIG. 2 illustrates a cross sectional view of another embodiment of an airflow heat exchanger for an electronic device and docking apparatus utilizing a vertical fan arrangement.

The port replicator may also be short in height relative to its width and length dimensions. The port replicator 150 may have an inclined surface so that the portable computing device 100 may be inclined for easier use of a keyboard. Nonetheless, the bottom surface 116 and the vents 145 and 165 remain substantially horizontal. Among other things, this substantially horizontal airflow interface at the bottom surface of removably mated electronic device distinguishes this embodiment from conventional cooling techniques since the bottom surface of such portable computing devices is typically covered and not used for cooling Another embodiment utilizing an airflow heat exchanger is shown in FIG. 2. In this embodiment, a docking device 200 utilizes a vertically mounted fan 220 and a duct 210 to provide increased airflow to the portable computing device 100. Again, a vent 215 aligns with the vent 145 on the substantially horizontal bottom surface of the portable computing device. This embodiment may allow a shorter profile (height) for the portion of the port replicator 200 that the base of the portable computing device rests on because the fan 220 is not underneath that portion.

Figure 3:
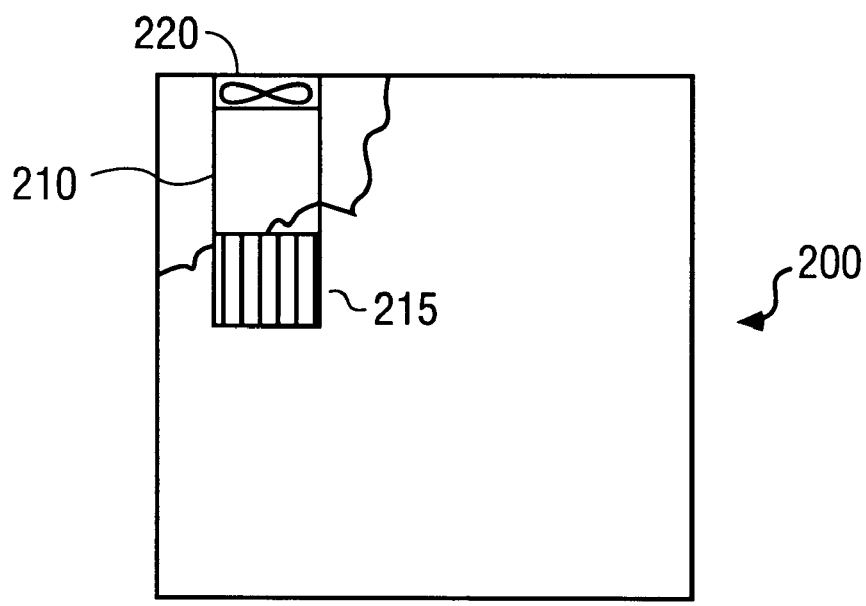
FIG. 3 illustrates a partial cut-away plan view of one embodiment of the airflow heat exchanger shown in FIG. 2.

FIG. 3 illustrates a top (plan) view of one embodiment of the docking device 200 shown in FIG. 2. In the embodiment of FIG. 3, the fan 220, duct 210, and vent 215 are offset from the center of the docking device 200. Likewise, the vent 145 in the portable computing device would be offset, creating an enhanced airflow region extending predominantly horizontally through the portable computing device 100 to cool one or more components.

Figure 4A:
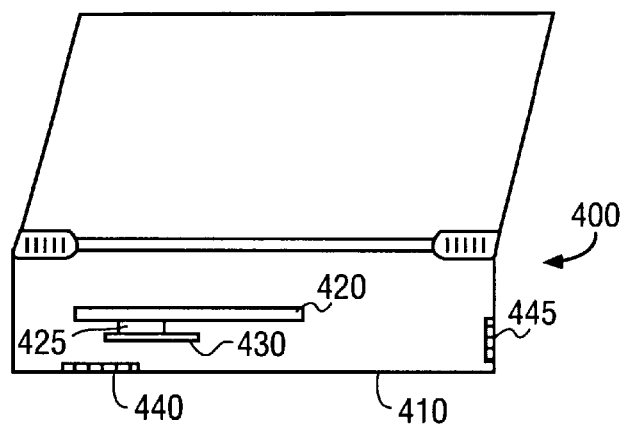
FIGS. 4A and 4B respectively illustrate cross sectional and plan views of a portable computing device having an electronic component mounted on top of a circuit board.
Figure 4B:
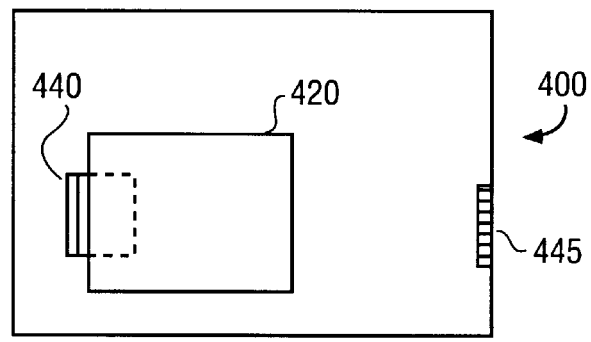

FIGS. 4A and 4B illustrate one embodiment of a portable computing device 400 that has vents positioned to create an enhanced airflow region extending horizontally or substantially parallel to the bottom surface of the portable computing device 400. In the illustrated embodiment, a circuit board 420 has an electronic component 425 mounted on its bottom side. A heat sink 430 is thermally and mechanically coupled to the electronic component 425. The heat sink 430 (as well as other heat sinks discussed herein) may be a heat spreader plate, a finned heat sink, a heat pipe device, or another known or available type of heat dissipation mechanism.

This arrangement differs from the conventional placement of heat sinks because the heat generating and dissipating components are located below the circuit board 420. Without an airflow heat exchanger enhancing airflow beneath the circuit board, such an arrangement may stifle heat dissipation because the circuit board above the heat sink may limit convective airflow. However, by forcing additional air through a bottom vent, suitable cooling of the electronic component 425 may be achieved with the electronic component 425 and the heat sink 430 mounted below the circuit board 420.

As can be seen from the plan view in FIG. 4B, in some embodiments, the bottom vent 440 is offset from the center of the portable computing device 400. Thus, air may enter the bottom vent 440 and flow predominantly horizontally across the electronic component 425 and heat sink 430 to the side vent 445. Notably, however, airflow may be reversed. In this embodiment, the bottom vent 440 is partially under the circuit board 420 and extends slightly to the left of the circuit board 420. As can be appreciated from FIG. 4A, in this embodiment, the side vent 445 is located in a lower portion (e.g., the bottom half) of the base of the portable computing device 400 or at least below the circuit board 420.

The positioning of the vents ensures that the enhanced airflow region includes the air surrounding the electronic component 425. The enhanced airflow region is largely bounded or defined by components which effectively channel air in the portable computing device 400. For example, in the embodiment of FIGS. 4A and 4B, the circuit board 420 and its placement with respect to the bottom vent 440 and the side vent 445 dictates that a substantial flow of air remain beneath the circuit board 420. Since a duct is not used in this embodiment, however, airflow may also be increased in other areas of the computing device 400. Additionally, other objects such as power supplies, memory, communication devices, and the computer housing may affect the airflow.

Figure 5A:
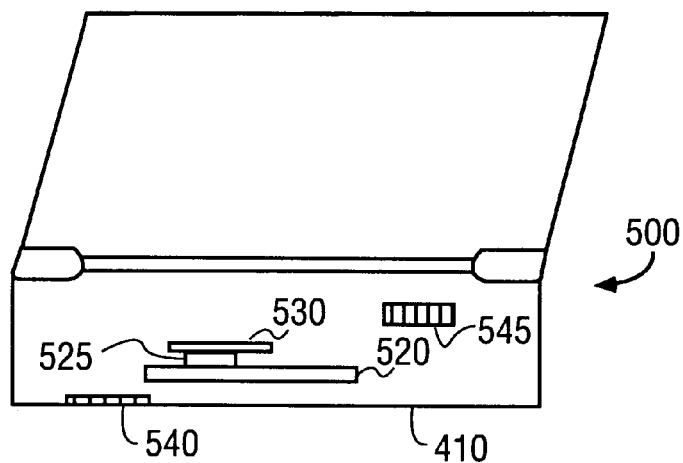
FIGS. 5A and 5B respectively illustrate cross sectional and plan views of a portable computing device having an electronic component mounted underneath a circuit board.
Figure 5B:
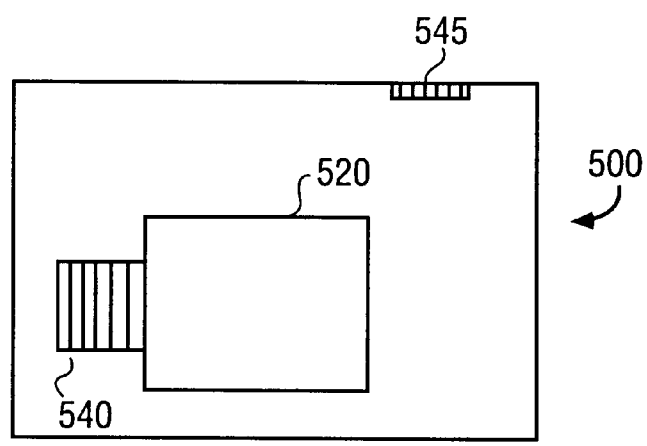

FIGS. 5A and 5B illustrate an embodiment of a computing device 500 in which air flows in through a bottom vent 540, over a circuit board 520, and through a rear vent 545. Again, airflow may be reversed by drawing air out through the vent 540. In this embodiment, an electronic component 525 and heat sink 530 on top of the circuit board, and the positioning of the vents causes a substantial portion of air to flow over the electronic component 525 and heat sink 530.

In particular, as can be seen in FIG. 5A, the rear vent 545 is in an upper portion (e.g., the upper half) of the computing device 500. To promote airflow above the circuit board 520, the rear vent typically will at least be placed above the circuit board. Like the embodiment of FIGS. 4A and 4B, the bottom vent 540 is offset from the center. As can be seen in FIG. 5B, the bottom vent 540 may be further to the left of the circuit board (or the circuit board 520 further to the right) than in FIGS. 4A and 4B. In this manner, more air may flow up and above the circuit board 520.

Figure 6:
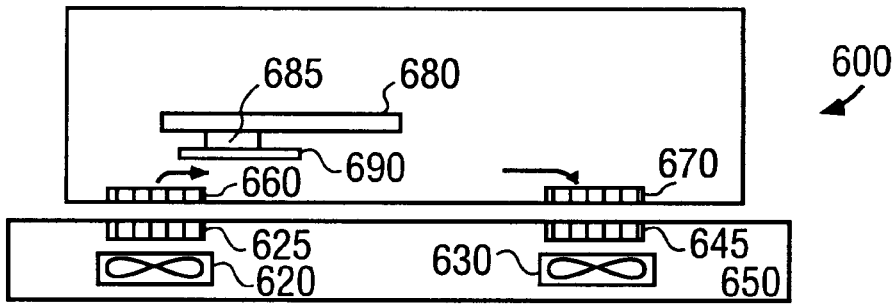
FIG. 6 illustrates a docking device utilizing dual fans and dual vents to enhance airflow through bottom vents of an electronic device.

In the embodiment shown in FIG. 6, two fans are utilized to enhance airflow through a computing device 600. In this embodiment, a docking device 650 includes a fan 620 positioned beneath a vent 625. The vent 625 aligns with a bottom vent 660 in the computing device 600. Another fan 630 is positioned beneath a vent 645 which is aligned with a vent 670 when the computing device 600 is mated with the docking device 650.

Both fans are thus positioned to increase airflow through the computing device 600. In one embodiment, one of the fans is configured to force air into the electronic device and the other is configured to draw air from the electronic device. Also, in the illustrated embodiment, a circuit board 680 has an electronic device 685 and a heat sink 690 attached on a bottom side. Alternatively, these components may be placed on the top side.

Figure 7:
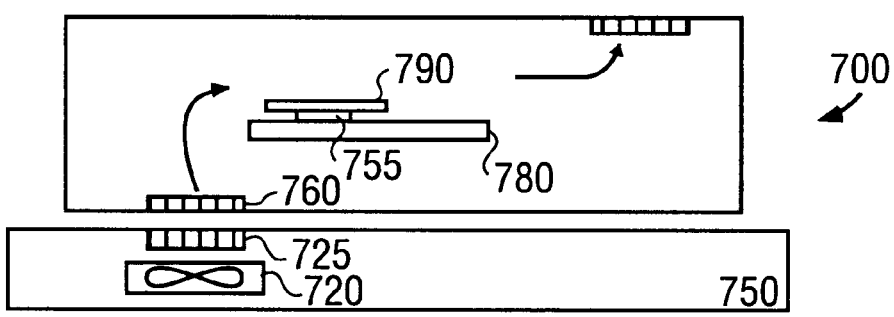
FIG. 7 illustrates a docking device that passes air through a top side vent and a bottom side vent.

FIG. 7 illustrates an embodiment of a computing device 700 that has a bottom vent 760 and a top vent 765. Air flow through the computing device 700 is increased when the computing device is mated with a docking device 750 having a fan 720 which either blows air in to or draws air from the computing device 700 through a vent 725. A circuit board 780 with an electronic component 785 and heat sink 790 attached thereto lies in an enhanced airflow region created when the fan 720 is operative and the devices are mated.

FIGS. 8A–8D illustrate embodiments utilizing a duct 835 in a computing device 800 having a bottom vent 840 to allow additional forced airflow when the computing device 800 and a docking device 850 are mated. This arrangement may advantageously channel additional airflow through a duct rather than over electronic components, thereby reducing the amount of dust and other particles likely to settle on such components.

Figure 8A:
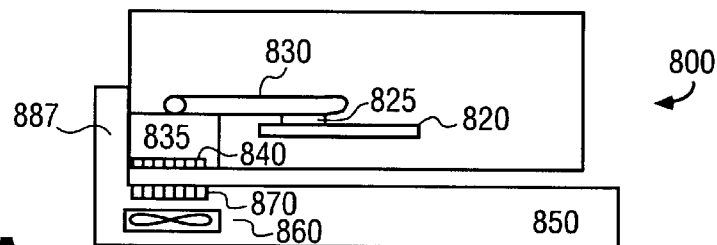
FIG. 8A illustrates a frontal cross sectional view of one embodiment of an airflow heat exchanger for an electronic device and docking apparatus utilizing a duct within the electronic device.

As shown in FIG. 8A, the docking device 850 includes a fan 860 underneath a vent 870. The duct 835 in the computing device 800 has an opening at the bottom vent 840. A heat transfer element 830 (e.g., a heat pipe or other suitable thermally conductive mechanism) thermally couples an electronic component 825 to the duct 835. Again, the electronic component 825 may be mounted on a circuit board 820.

Figure 8B:
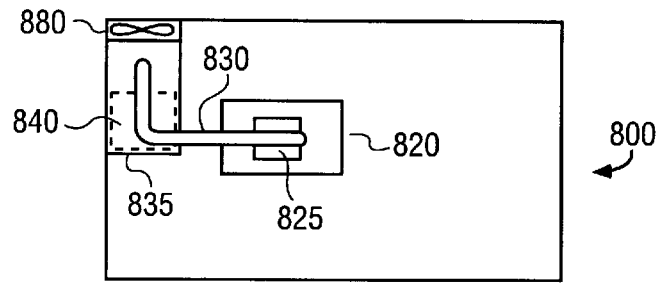
FIG. 8B illustrates a plan view of one embodiment of the apparatus shown in FIG. 8A.
Figure 8C:
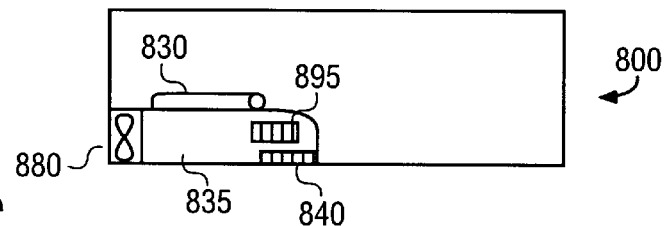
FIG. 8C illustrates a partial cut-away side view of one embodiment of the apparatus shown in FIGS. 8A and 8B.

As shown in FIG. 8B, a fan 880 may be placed at a rear corner of the computing device 800 to force air through the duct 835. Typically, the fan 880 and the fan 860 are operated in series with both fans driving air through the duct in the same direction. The fan 860 in the docking device 850 may be more powerful since external (e.g., alternating current) power may be available. Since the bottom of the computing device 800 typically rests on a flat surface during operation, the bottom vent 840 may be blocked if the computing device 800 is not docked. Therefore, as shown in FIG. 8C, a side vent 895 may be used to allow air flow through the duct 835.

Figure 8D:
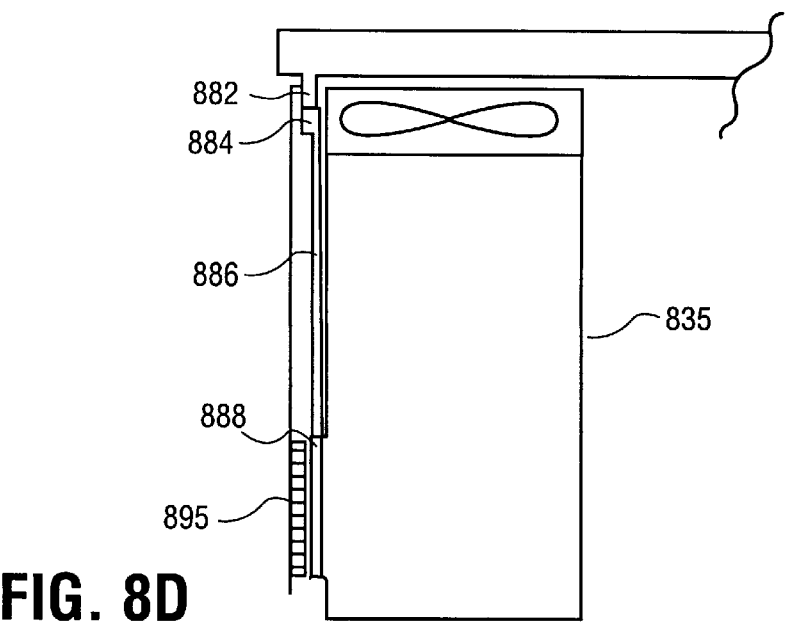
FIG. 8D illustrates one embodiment in which the electronic device includes a vent closing mechanism to close a side vent of the duct.

It may be desirable to block the side vent 895 when the computing device 800 is docked in order to prevent air from flowing in the bottom vent 840 directly out the side vent 895, or vice versa. Accordingly, FIGS. 8A and 8D illustrate embodiments of side vent blocking mechanisms. In FIG. 8A, a side portion 887 of the docking device 850 extends upward and along the side of the computing device 800. This side portion 887 reduces the amount of air that can escape from a side vent.

In FIG. 8D, the vent blocking mechanism is contained in the computing device. An actuator prong 882 in the docking device contacts a receiving mechanism 884 when the computing device and dock are mated. The receiving mechanism 884 is connected to a lever arm 886 which itself is connected to a vent cover 888. The vent cover 888 may move upwardly, downwardly, or otherwise move to cover the side vent 895 when the portable computing device and dock are mated, resulting in reduced airflow through the side vent and enhanced airflow through the duct.

Thus, an airflow heat exchanger for a portable electronic device and port replicator, docking station, or mini-docking station is disclosed. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. A docking apparatus comprising:
   a housing configured to removably mate with an electronic device, the housing having a first vent on a substantially horizontal surface; and
   a fan positioned to increase airflow through the first vent and through the electronic device when the electronic device is mated with the housing, the fan being mounted vertically in the docking apparatus;
   a second vent in a vertical surface of the docking apparatus adjacent to the fan;
   a duct from the fan to the first vent;
   a first electronic connector positioned to be electronically coupled to a plurality of signal lines from the electronic device when the electronic device and housing are mated.

2. The docking apparatus of claim 1 further comprising:
   a second electronic connector coupled to at least one of the plurality of signal lines via the first electronic connector, the second electronic connector providing an interface for a device that exchanges data with the electronic device when the electronic device and the housing are mated.

3. The apparatus of claim 1 further comprising a side vent blocking mechanism being mechanically actuated to block a side vent of the electronic device when the electronic device is mated with housing.

4. An apparatus comprising:
   an electronic device comprising:
      a first housing having a first vent which is a bottom vent;
      an electronic component positioned within said first housing;
   a docking device comprising:
      a second housing configured to removably mate with the electronic device, the second housing having a second vent which is positioned to align with the first vent; and
      a fan positioned to enhance airflow through the second vent and to enhance airflow within the electronic device when the electronic device and the docking device are mated, the fan being mounted vertically in the docking apparatus;
      a second vent positioned in the docking device to align with the bottom vent when the docking device and the electronic device are mated; and
      a duct attached to the fan at a first end and attached to the second vent at a second end.

5. The apparatus of claim 4 wherein the docking device further comprises:
   an electronic connector positioned to be electronically coupled to a plurality of electronic signal lines from the electronic device when the electronic device and docking device are mated.

6. The apparatus of claim 4 wherein the electronic device has a third vent positioned in the first housing to enhance airflow cooling of the electronic component.

7. The apparatus of claim 6 wherein an enhanced airflow region within the electronic device extends from the first vent predominantly horizontally across the electronic component to the third vent.

8. The apparatus of claim 6 wherein the first housing forms a chamber and wherein airflow within the electronic device is channeled by components in the electronic device.

9. The apparatus of claim 8 wherein one of the second vent and the third vent is offset with respect to the electronic component to enhance airflow through a region of the chamber proximate the electronic component.

10. The apparatus of claim 4 wherein the electronic component further comprises:
    a duct with a first inlet engaging the first vent; and
    a heat transfer element thermally coupling the electronic component to the duct, the heat transfer element being directly attached to an outer surface of the duct.

11. The apparatus of claim 10 wherein the electronic device has a third vent providing a second inlet to the duct and wherein the electronic device further comprises a vent blocking mechanism that is mechanically actuated to block the third vent when the electronic device is mated with the docking device.

12. An apparatus comprising:
    a housing to removably mate with an electronic device, the housing having a first vent and a second vent on a substantially horizontal surface; and
    a first fan and a second fan positioned to increase airflow through the first vent, the second vent, and through the electronic device when the electronic device is mated with the housing, one of the first fan and the second fan being configured to force air into the electronic device and the other of the first fan and the second fan being configured to draw air from the electronic device;
    a first electronic connector positioned to be electronically coupled to a plurality of signal lines from the electronic device when the electronic device and housing are mated.

13. The apparatus of claim 12 wherein the electronic device is a portable computer and wherein the portable computer comprises a bottom surface with two vents that align with the first vent and the second vent of the housing.

14. An apparatus comprising:
    a housing to removably mate with an electronic device having an electronic device bottom vent, the housing having a first vent which is a horizontal housing vent;
    a fan positioned to increase airflow through the electronic device bottom vent and through the electronic device when the electronic device is mated with the housing;
    a vent blocking mechanism mechanically actuated to block a second electronic device vent in the electronic device, the second electronic device vent being blocked when the electronic device is mated with the housing;
    a second housing vent in a vertical surface of the housing adjacent to the fan; and
    a duct from the fan to the first vent.

15. The apparatus of claim 14 wherein said fan is horizontally mounted in the housing beneath a substantially horizontal surface of the housing.

16. The apparatus of claim 14 further comprising a portable computer as the electronic device, the portable computer having an internal duct with a bottom opening and a side opening aligned with said second electronic device vent, the second electronic device vent being blocked by the blocking mechanism when the housing and the portable computer are mated.

17. The apparatus of claim 14 wherein the vent blocking mechanism comprises:

a receiving mechanism actuated by mating of the electronic device and the housing;

a lever arm coupled to the receiving mechanism; and a vent cover mechanically coupled to the lever arm.

* * * * *